United States Patent [19]

Schroeder et al.

[11] Patent Number: 4,838,173
[45] Date of Patent: Jun. 13, 1989

[54] DRAW BAR FORCE SENSING LOCOMOTIVE CONTROL SYSTEM

[75] Inventors: Paul K. Schroeder, Center Point; Gary W. Sampson, Marion, both of Iowa

[73] Assignee: Rockwell International Corporation, El Segundo, Calif.

[21] Appl. No.: 169,257

[22] Filed: Mar. 15, 1988

[51] Int. Cl.⁴ .............................................. B61C 3/00
[52] U.S. Cl. ...................................... 105/35; 105/61; 246/187 R; 213/1 R; 180/14.6
[58] Field of Search ............... 105/61, 35; 180/14.6; 246/169 R, 182 R, 187 R, 182 C; 104/300; 213/1 R, 75 R, 1.3, 1.6, 75 D, 2

[56] References Cited

U.S. PATENT DOCUMENTS

| | | | |
|---|---|---|---|
| 2,298,216 | 10/1942 | Lamberger et al. | 73/862.56 |
| 2,900,818 | 8/1959 | Starr | 73/855 |
| 3,217,663 | 11/1965 | Hughson | 246/187 R |
| 3,358,613 | 12/1967 | Smith et al. | 105/61 |
| 3,560,054 | 2/1971 | Sarbach | 105/61 X |
| 3,995,696 | 12/1976 | Kainer et al. | 172/7 |
| 4,095,147 | 6/1978 | Mountz | 105/35 X |

FOREIGN PATENT DOCUMENTS 1188640  3/1965  Fed. Rep. of Germany ........ 105/61
796225   6/1958  United Kingdom .

*Primary Examiner*—Robert B. Reeves
*Assistant Examiner*—Frank H. Williams, Jr.
*Attorney, Agent, or Firm*—Gregory G. Williams; M. Lee Murrah; H. Fredrick Hamann

[57] ABSTRACT

An improved strain sensor is disclosed utilizing a linear variable displacement transducer (LVDT) to precisely output the linear strain over a structural member. The LVDT is mounted utilizing a position apparatus having a similar coefficient of thermal expansion as the structural member, and effectively integrates the strain over the entire longitudinal dimension of the member by precisely measuring displacement under load. This assembly is readily incorporated in locomotive couplers and crane structures having a void or hollow coinciding with the neutral bending axis of the member being tested, as well as over relatively large spans, in pairs or singly, having bending moments present. A locomotive control system for increasing the strain on a locomotive coupler by monitoring the draw bar force with an associated generator speed and maximizing the draw bar force by manipulating the generator speed. A CPU interconnects the draw bar force sensor and the engine generator and makes comparisons and calculations necessary to set the generator speed in order to maximize draw bar force.

1 Claim, 2 Drawing Sheets

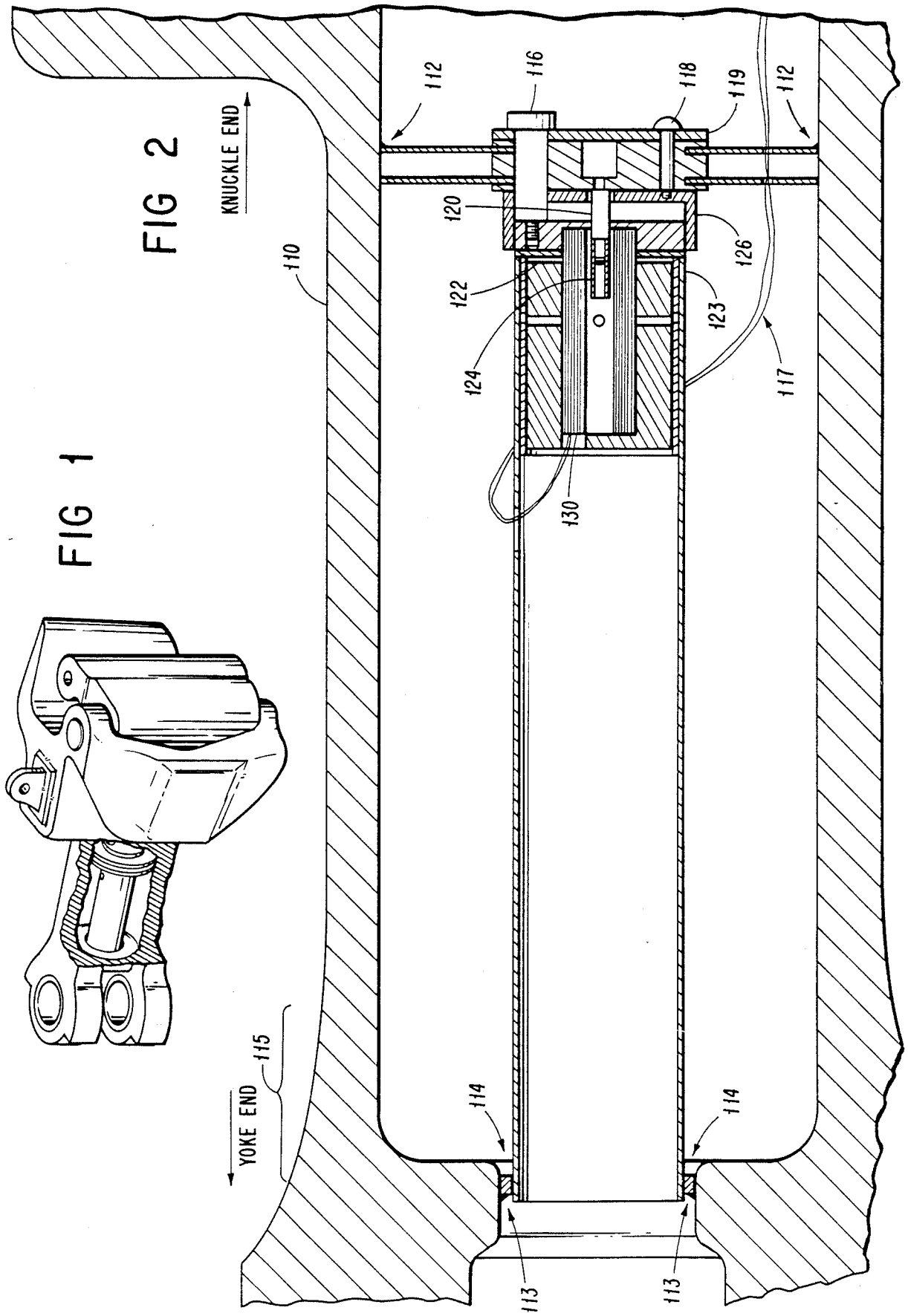

DRAW BAR FORCE SENSING LOCOMOTIVE CONTROL SYSTEM

BACKGROUND OF THE INVENTION

This invention relates to mechanical displacement measuring apparatus and more particularly, to linear variable displacement transducer applications. And furthermore, relates to a system and method for utilizing the measuring apparatus to control a locomotive.

The use of strain gauges having a variable resistance as a function of strain applied to a tested member has been utilized to narrowly ascertain the strain at specific points on the surface of a structural member under load. In a large hollow unit, for example, the strain sensors may be mounted externally or internally on the surface of the member, and further must be mounted in pairs to differentiate the bending moment errors introduced by actual deformation in other than linear fashion. As is known in the art, the strain gauges are usually located at the part of the structural member undergoing the greatest strain (i.e., the thinnest part, or the site most likely to undergo deformation).

For relatively long structural members having substantially constant cross-sections, the use of a number of strain gauges is required to first ascertain the collective strain over the entire member, and secondly to offset bending moment errors introduced by structural bending.

Alternatively, a pair of resistive strain gauges may be located on opposing points of a longitudinal structural member and by assessing the difference in strain gauge readings, the bending moments may be eliminated and further the remaining strain is extrapolated to a value sufficient to describe the total strain over the length of the member.

In the operation of a locomotive pulling a load through a draw bar and a locomotive coupler, it is often desirable to maximize the strain upon the draw bar and thereby maximizing the force and work delivered from the locomotive to its load. In the past, several indirect methods have been used to maximize the useful work output of a locomotive. One method has been to monitor the ground speed of the locomotive and concurrently monitor the speed of the locomotive wheels in an attempt to prevent excessive wheel slip. This method has several problems. First of all, it is an indirect measure of the actual work output of the locomotive, and as such it is limited in its ability to provide the ultimate desired results. Furthermore, the accuracy and the sensitivity of the measurements necessary for this method need improvement.

SUMMARY

Accordingly, an object of the present invention is to provide a strain sensor having the capability of eliminating bending moment error in a longitudinal member while utilizing a single strain sensor.

Another object of the present invention is to provide an improved strain sensor having the capability of integrating the total strain over the length of a linear structural member utilizing a single strain gauge.

A yet further object of the present invention is to provide an improved strain sensor utilizing a single unit to ascertain the collective linear strain over a structural member and simultaneously eliminate bending moment errors utilizing a single strain sensor.

An additional object of the present invention is to provide an improved strain sensor utilizing mechanical implementation of the total strain across a structural member having improved sensitivity and repeatability, and further improve reliability by providing protection to the sensor.

A still further object of the present invention is to maximize the strain placed upon a locomotive draw bar in an effort to maximize the work output of the locomotive.

An improved strain sensor, in accordance with the present invention, comprises a structural member having a major longitudinal axis, a linear variable displacement transducer, having an outer member rigidly attached to one end of the major longitudinal axis of the structural member, and having an inner member rigidly attached to the opposite end of the major longitudinal axis of the structural member. The rigid attachment member has a substantially similar coefficient of thermal expansion as that of the structural member, and the linear variable displacement transducer is substantially co-located with a bending moment neutral axis of the structural member. Furthermore, an improved strain sensor is used in combination with a control CPU to directly or indirectly manipulate the operation of a locomotive engine.

Other objects and advantages of the present invention will become apparent upon reading the following detailed description in conjunction with the drawings in which:

BRIEF DESCRIPTION OF THE DRAWINGS

FIG. 1 is a perspective view of a locomotive coupler in partial cut-away showing one embodiment of the invention installed therein.

FIG. 2 is a partial view of one embodiment of the present invention installed in the coupler of FIG. 1 showing the actual installation in detailed cross-section.

DETAILED DESCRIPTION OF THE INVENTION

Figure 3:
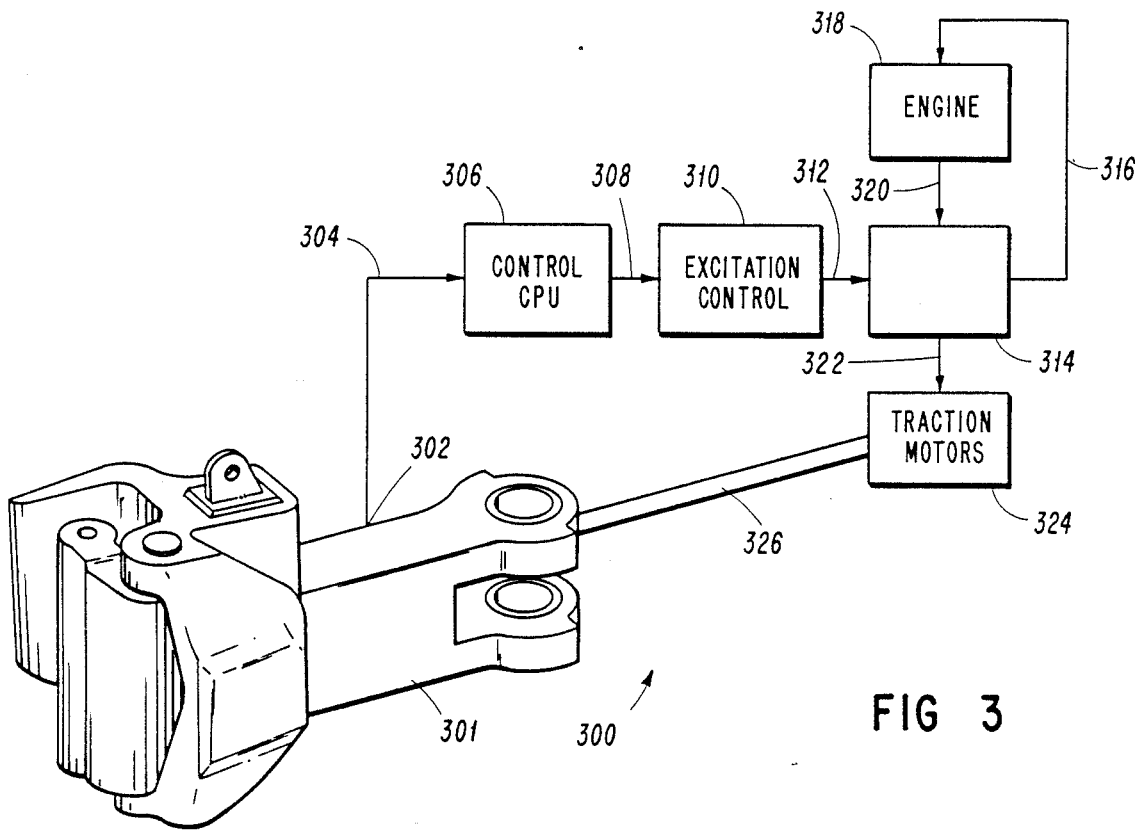
FIG. 3 is a schematic representation of a strain sensor control system for controlling a locomotive having an existing excitation control system.

Referring now to FIG. 1, a respective partial cut-away view of a locomotive coupler is shown having the LVDT coupled therein.

In FIG. 2, a portion of the coupler of FIG. 1 is shown in partial cut-away view wherein the LVDT core 124 is attached through a mounting fixture 120, 126 and through wells 112 to the coupler itself. The outer coil of the LVDT 130 is firmly attached to the corresponding mounting structure 123 and through wells 113 and bracket 114 as attached to the opposite end of the coupler.

As can be seen in region 115, the thickness of the coupler increases, however, the ease of attachment of the mounting structure to the coupler at points 113 by tack-welding is significant and the calibration of the LVDT displacement is done computing the narrow region 110 over the longitudinal portion of the coupler having substantially the same cross-section.

Accordingly, the longitudinal length of the coupler having the strain measured as a positive or negative displacement by the LVDT 130, 124 is the distance from wells 112 to wells 113 less the thickened region 115.

The installation of the sensor is performed by inserting the LVDT in combination with the mounting structure into the proper position, tack-welding at 113 the bracket 114, and thereafter tack-welding the support brackets at points 112. Thereafter, the fixture bolt 116 is removed, subsequently allowing movement between the member 123 and 126 in a linear fashion. The entire assembly is designed such that the central axis of the LVDT is positioned at the neutral bending moment axis of the coupler and thereby removes any requirement for a compensating strain gauge.

It should be noted that bending may occur without any significant output by the LVDT. This results from the location of the sensor on the neutral bending moment axis. However, the use of the coupler in normal operations has a low expectancy of any bending forces and therefore the stress and resultant fatigue from repeated bending may be disregarded in this embodiment. This is a result of the primary failure mode of the coupler in compression or in tension, due to severe impact or tensile loads being placed on the coupler.

In other embodiments, the strain sensor substantially as shown in cooperation with the mounting structure, can be utilized externally in pairs or singly to obtain the linear displacement over the entire structural length as may be required. The advantage of using the mounting structure as shown herein, particularly the protective shroud over the LVDT structure itself, is protection from damage and the integration of the total linear displacement of the member to be output by the LVDT. The displacement measurement of the transducer is necessarily less precise than that of a resistive strain sensor. However, this is offset in the shown embodiment as well as in other applications as will become readily apparent, by the mechanical amplification of the mounting means having a much longer sample to measure than with typical resistive strain sensors. It should be noted that the cross-sectional area of the member being measured, perpendicular to the displacement axis, should be consistent to obtain an appropriate integrated output from the sensor.

The actual configuration of the mounting means 123 and the fixture 126, 119 and connecting screw 118 are matters of design choice for particular applications. The criteria for rigid attachment requires the ability to maintain rigid location of the LVDT on the neutral bending moment axis, as well as rigid attachment of the external coil of the sensor 130 to one end 113 and simultaneously the inner coil 124 maintained proper position with respect to the attachment at points 112.

The linear variable displacement transducer chosen in this embodiment has a measurable displacement of approximately one inch. The fixation locations of the mounting structure are approximately twelve inches apart, providing a mechanical implementation over the consistent cross-sectional portion of the coupler of approximately ten to one, after subtracting approximately two inches to compensate for the thicker region 115. Therefore, it can be seen that the forces required to extend or compress the coupling are amplified by extending the mounting positions over the length of the coupler to amplify the detected displacement and thus obtain an integrated strain reading over the narrowed longitudinal portion of the coupler.

Thus, the installation fixture bolt 116 is utilized to maintain a neutral position for the core relative to the external coil of the sensor, only during installation or removal. Thereafter, bolt 116 is removed having established a proper neutral position in a coupler or other structural member in an unloaded condition. Bolt 118 provides a connection to maintain a move- ment sleeve 126 for the mounting structure 123 whereby the spacing shown at region 120 remains free of contamination. The actual mounting of external coil 130 to the mounting structure 123 is performed such that proper spacing 122 is maintained allowing for thermal expansion.

While this invention has been described with reference to a particular embodiment, the novel features and unobvious aspects of the present invention may be readily adapted to other applications such as cranes, tractors, and other vehicular and structural applications having a hollow longitudinal structure member or a beam and truss configuration with the neutral bending axis coinciding with a void in the member.

Additionally, solid structural members as well as curved and cantilever configurations may be measured utilizing the present invention, so long as bending motions are either neutralized as by constraining the member, or compensated by utilizing two sensors to obtain a differential output. The sensor and mounting means having a sufficient span to provide displacement appropriate to the sensitivity of the LVDT selected, are positioned therein and the integrated displacement of the structural member is thereafter readily ascertained.

Now referring to FIG. 3 there is shown a strain sensor control system, generally designated 300, which includes a locomotive draw bar 301 having a strain sensor 302 disposed therein which is connected to a control CPU or direct analog circuit 306 by line 304. Control CPU 306 is a processor for receiving and analyzing the output of sensor 302 through line 304. CPU 306 may make trend information from the sensor 302 output and generate a summing node control signal out on line 308 to an existing excitation control module 310 to determine if the wheel/rail interface can sustain more shear stress (with a resultant greater tractive force) or will cause slip to occur. The results are sensed by the sensor 302 and monitored by the CPU 306 and adjustments are made accordingly. Control 310 is coupled to power circuitry which is interconnected by lead 316 to generator 318 which is inturn looped back to circuitry 314 by lead 320 and ultimately providing a variable control through line 322 to traction motors 324 which are mechanically coupled by framework apparatus 326 to the draw bar 301.

Figure 4:
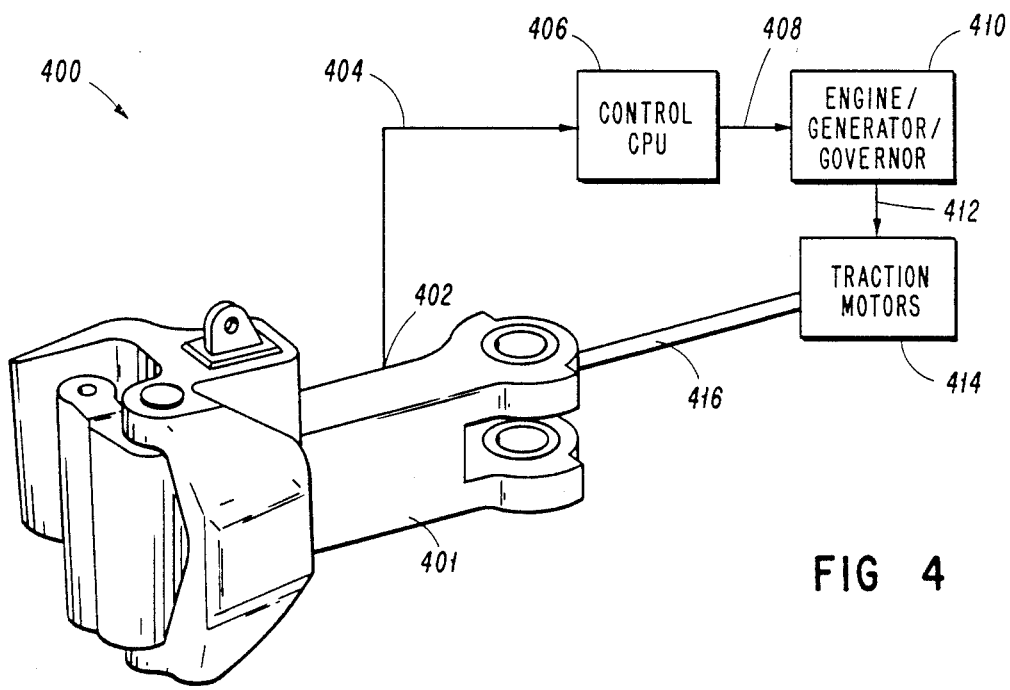
FIG. 4 is a schematic representation of a strain sensor control system for directly controlling a locomotive engine.

Now referring to FIG. 4 there is shown a similar strain sensor control system generally designated 400 including a locomotive draw bar 401 having a strain sensor 402 disposed therein which is connected to a control CPU 406 by line 404. Control CPU or direct analog circuit 406 is similar to control CPU 306 which generates an output control signal on line 408 to engine generator 410 which is interconnected with the traction motors 414 by line 412. Traction motors 414 are mechanically coupled by frame apparatus 416 with the locomotive draw bar and coupler 401.

The engine or generator 318, circuitry 314, and excitation control 310 can be regarded, in comibination, as apparatus capable of performing, in part, as a wheel speed regulator. Similarly, engine generator 410 may be considered to be a wheel speed regulator. A wheel speed regulator may comprise any apparatus which is capable of regulating the locomotive wheel speed.

It is believed that the apparatus and system of the present invention and many of their attended advantages will be understood from the foregoing description, and it will be apparent that various changes may be made in the form, construction, and arrangement of the parts thereof without departing from the spirit and scope of the invention or sacrificing all of their material advantages, the form herein before described being merely a preferred or exemplary embodiment thereof. It is the intention of the following claims to encompass and include all of such changes.

We claim:

1. A locomotive control system comprising:

a locomotive frame;

a locomotive draw bar coupled with said locomotive frame for providing coupling capabilities with other rail cars;

a locomotive draw bar force sensor, operatively associated with said locomotive draw bar, for generating force signals;

a locomotive engine generator coupled with said locomotive frame, for generating electric power;

a locomotive engine generator sensor coupled with said locomotive frame and said locomotive engine generator for generating locomotive engine generator signals which correspond to the locomotive engine generator output;

means for monitoring said force signal and said generator signal and issuing a command signal to said locomotive engine generator to operate the locomotive engine generator at a level having the locomotive engine generator signal which corresponds to the maximum of said force signals; and a traction motor interconnected with said locomotive engine generator capable of receiving electrical power from said locomotive engine generator for causing rotation of at least one locomotive wheel; whereby said locomotive draw bar force sensor detects strain within said draw bar and generates a sensing signal corresponding to the draw bar strain which is supplied to the means for monitoring, where trend information is compared and the command signal is generated for manipulating the operation of the locomotive engine generator at the locomotive engine generator level which corresponds to the maximum of said force signals from said draw bar force sensor; thereby, maximizing the draw bar force.

* * * * *